US008403086B1

(12) United States Patent
Free et al.

(10) Patent No.: US 8,403,086 B1
(45) Date of Patent: Mar. 26, 2013

(54) SYSTEM, METHOD AND APPARATUS FOR SUPPLYING SUPPLEMENTAL POWER TO AN ELECTRIC VEHICLE

(75) Inventors: Leonard Michael Free, Covington, GA (US); Steve Wagner, Pensacola, FL (US)

(73) Assignee: Leonard Michael Free, Covington, GA (US)

(*) Notice: Subject to any disclaimer, the term of this patent is extended or adjusted under 35 U.S.C. 154(b) by 701 days.

(21) Appl. No.: 12/245,604

(22) Filed: Oct. 3, 2008

Related U.S. Application Data

(60) Provisional application No. 60/998,026, filed on Oct. 5, 2007.

(51) Int. Cl.
*B60K 6/20* (2007.10)

(52) U.S. Cl. .................. 180/65.21; 180/65.31

(58) Field of Classification Search .............. 180/65.29, 180/65.2, 65.31, 65.1, 65.23, 65.245, 65.6, 180/65.21; 320/104, 103
See application file for complete search history.

(56) References Cited

U.S. PATENT DOCUMENTS

| | | | | |
|---|---|---|---|---|
| 4,199,037 A * | 4/1980 | White | 180/65.245 |
| 5,150,045 A * | 9/1992 | Nagano et al. | 322/10 |
| 5,346,031 A * | 9/1994 | Gardner | 180/65.23 |
| 5,664,635 A * | 9/1997 | Koga et al. | 180/65.245 |
| 5,751,137 A * | 5/1998 | Kiuchi et al. | 180/65.29 |
| 5,788,004 A * | 8/1998 | Friedmann et al. | 180/65.28 |
| 5,828,201 A * | 10/1998 | Hoffman et al. | 320/104 |
| 5,869,950 A * | 2/1999 | Hoffman et al. | 320/103 |
| 6,262,561 B1 * | 7/2001 | Takahashi et al. | 320/104 |
| 6,390,215 B1 * | 5/2002 | Kodama et al. | 180/65.22 |
| 6,394,209 B1 * | 5/2002 | Goehring et al. | 180/65.245 |
| 6,429,613 B2 * | 8/2002 | Yanase et al. | 180/65.245 |
| 6,469,402 B2 * | 10/2002 | Morimoto et al. | 180/65.27 |
| 6,480,767 B2 * | 11/2002 | Yamaguchi et al. | 180/65.25 |
| 6,791,295 B1 * | 9/2004 | Berels | 320/103 |
| 6,799,650 B2 * | 10/2004 | Komiyama et al. | 180/65.245 |
| 6,877,576 B2 * | 4/2005 | Wilton et al. | 180/65.245 |
| 6,880,654 B2 * | 4/2005 | Plishner | 180/65.6 |
| 7,121,234 B2 | 10/2006 | Schmitz et al. | 123/41.02 |
| 7,127,337 B2 | 10/2006 | Bennett et al. | 701/22 |
| 7,224,132 B2 | 5/2007 | Cho et al. | 318/139 |
| 7,262,579 B1 * | 8/2007 | Shepard | 318/810 |
| 7,290,627 B1 * | 11/2007 | Gardner | 180/65.1 |
| 7,441,616 B2 * | 10/2008 | Sugita et al. | 180/65.285 |
| 7,475,747 B2 * | 1/2009 | Plishner | 180/65.31 |
| 7,610,143 B1 * | 10/2009 | Boesch | 701/112 |
| 7,740,092 B2 * | 6/2010 | Bender | 180/65.29 |
| 2002/0179348 A1 * | 12/2002 | Tamai et al. | 180/65.2 |
| 2004/0164703 A1 * | 8/2004 | Berels | 320/103 |
| 2005/0052080 A1 * | 3/2005 | Maslov et al. | 307/10.1 |
| 2007/0188125 A1 * | 8/2007 | Shepard | 318/778 |

* cited by examiner

*Primary Examiner* — Hau Phan

(74) *Attorney, Agent, or Firm* — Woodcock Washburn LLP

(57) ABSTRACT

A supplemental power supply system for supplying power to an electric engine. The system includes a generator for generating power, a charger coupled to the generator, wherein the charger provides charging power to a battery; and a drive module coupled to the generator, wherein the drive module provides power to an electric drive motor and wherein the battery simultaneously provides power to the electric drive motor.

3 Claims, 7 Drawing Sheets

SYSTEM, METHOD AND APPARATUS FOR SUPPLYING SUPPLEMENTAL POWER TO AN ELECTRIC VEHICLE

CROSS REFERENCE TO RELATED APPLICATIONS

This application is based on and claims priority from U.S. Provisional Application Ser. No. 60/998,026, which was filed on Oct. 5, 2007.

TECHNICAL FIELD

The present invention relates generally to power sources that are configured as series-hybrid power plants and more specifically to a series-hybrid supplemental power supply for use in vehicles such as golf carts.

BACKGROUND

Golf carts are used for a wide range of purposes ranging from traveling on the golf course to driving through golfing communities to even hunting, in which a variation of the golf cart provides transportation to and from a hunting location. Golf carts are typically powered by one of two different methods. Some golf carts run on electric power, while others are gasoline powered. Variations of golf carts are used for transportation on industrial campuses, which may require the extended range of gasoline-powered engines but also require the environmental aspects of electric power while in or near buildings. As such, there is a need for such carts to run on hybrid power.

With the development of hybrid vehicles that run on both gasoline and electricity, that hybrid technology has been applied to golf carts that contain both an electric and a gasoline powered drive engine to extend the range of golf carts and to conserve fuel. For example, U.S. Pat. No. 7,224,132 "Portable Range Extender Operable in Automatic and Manual Modes" discloses a portable automated range extender for an electric vehicle that monitors the voltage of the batteries and turns on or shuts off the engine at preprogrammed levels. Additionally, U.S. Pat. No. 7,121,234 "Hybrid Electric Vehicle and Method of Selectively Operating the Hybrid Electric Vehicle" discloses a series type hybrid electric vehicle that has a controller for operating both the engine and generator in various operating modes. Additionally, U.S. Pat. No. 7,127,337 "Silent Operating Mode for Reducing Emissions of a Hybrid Electric Vehicle" discloses generally the architecture of a series-hybrid.

These others have disclosed golf carts that contain both an electric and a gasoline powered engine that solve the major problem of switching from the range-extended gasoline powered engine to the range-limited electric operations. However, these hybrid carts remain limited. Limitations include cost, complexity, reliability, weight, efficiency, ease of use, and incomplete control of the power supplies. Moreover, none of the attempts to create a hybrid vehicle solve the problems of retrofitting a supplemental supply source into an existing system; user control of the engine and fuel supply; and electrically starting a smaller engine designed to fit in smaller spaces. Specifically, with respect to the latter, no generators smaller than 2500 watts in size are available with electric starters, thereby creating the need for pull-type starters for those smaller generators used in this operating environment.

SUMMARY OF THE INVENTION

The present invention is an apparatus for a golf cart that supplies power to the battery and electric drive motor of an electric golf cart.

In one example, the apparatus supplying direct current power to both the battery and an electric drive motor comprises a source of AC power, a charger, a drive module, and a battery and an electric drive motor of an electric golf cart. The source of AC power transfers power to the charger and drive module, which then converts AC power to DC power and transfers the direct current power to both the battery and electric drive motor of the golf cart.

The source of AC power may be an onboard alternative fuel engine coupled to a generator. The alternative fuel engine coupled to a generator may further comprise a ring gear which is incorporated into an alternative fuel engine coupled to a generator. The ring gear allows for an electric starter to be installed on small engines in inherently small confined spaces, for example, on a golf cart.

The alternative fuel engine coupled to a generator may also be coupled to a fuel tank. The fuel tank may further comprise of an overflow tube and a fuel tank shut off valve. The fuel shut off valve is configured to allow an operator to have full control of the fuel supplied to the alternative engine in case of emergencies such as fire suppression purposes. The overflow tube is configured to allow fumes, or even spilt fuel to be vented away from a source of ignition.

The alternative fuel engine coupled to a generator uses fuel supplied from the fuel tank to create AC power to be transferred to a charger and drive module.

In another example of the invention, the system may comprise two sources of AC power, one being an onboard source and the other being an external source.

In another example, the apparatus may further comprise a control switch that is configured to allow an operator of the golf cart to manually activate or deactivate the source of power. The control switch may be configured to be positioned to off, drive (electric golf cart operations only, or electric golf cart combined with the source of power), generator on, or start generator.

The apparatus may also have a cart controller that is configured to convert the supplied power into motive power for use by the electric drive motor.

In still another example, the apparatus may comprise a source of power that is an external source comprising of standard alternating current, plug, battery, or some other form of power supplying mechanism.

The examples given in the summary of the invention are for illustration purposes and are not intended to limit the invention to the specific embodiments as described.

BRIEF DESCRIPTION OF THE DRAWINGS

The foregoing summary, as well as the following detailed description of illustrative embodiments, is better understood when read in conjunction with the appended drawings. For purposes of illustrating the invention, there is shown in the drawings example constructions of the invention; however, the invention is not limited to the specific methods and instrumentalities disclosed.

DETAILED DESCRIPTION OF ILLUSTRATIVE EMBODIMENTS

The subject matter of the various embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. The following description is illustrative and non-limiting to any one aspect.

Figure 1:
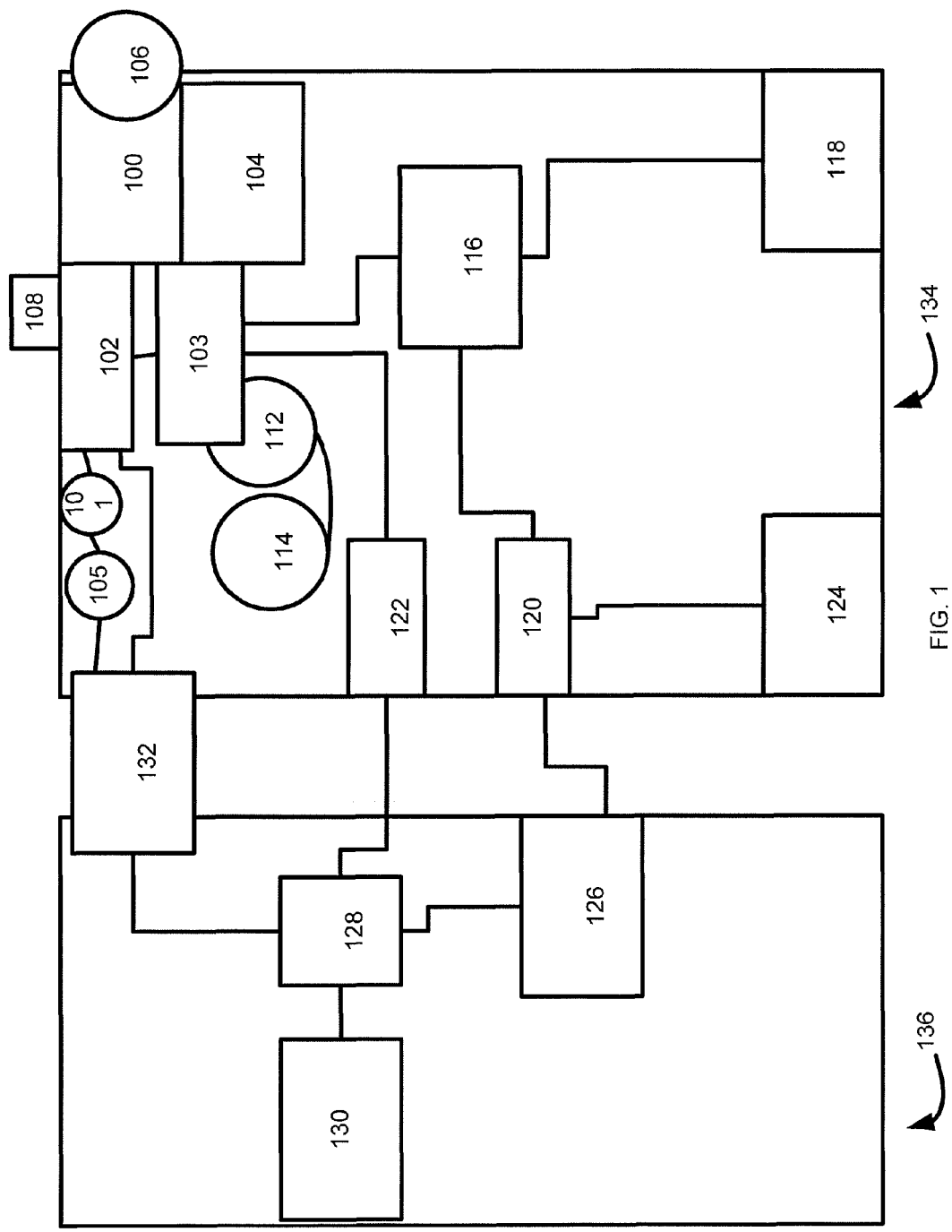
FIG. 1 is a block diagram of a hybrid power plant that interfaces to the power plant of a golf cart.

While the description of the preferred embodiment will use the example of power supplies for golf carts, the present invention may be used in other types of motorized vehicles, including but not limited to neighborhood electric vehicles, low-speed vehicles, utility-type vehicles, all-terrain vehicles, off-road vehicles, forklifts, and any other type of small electric motor vehicles. FIG. 1 illustrates an embodiment of the invention and shows a golf cart 136 and a supplemental power pack 134. While the two are described separately along with the interfaces which may, for example, be useful in a retrofit application, the invention is not limited thereby and the supplemental power pack 134 may be included and integrated at the time of manufacture. The golf cart 136 includes a battery 126, cart controller 128, and an electric drive motor 130. While one battery 126 is shown, it will be appreciated by those skilled in the art that a plurality of batteries may be included. Additionally, while the invention is being described in conjunction with batteries, specifically rechargeable batteries, other forms power sources may be used, including a super-capacitor. In operation, without the attached supplemental power pack 134, the cart controller 128 controls the flow of electric current from the battery 126 to the electric drive motor 130 which then powers the movement of the golf cart 136.

The supplemental power pack 134 includes a fuel tank 100 which feeds an engine 102 coupled to a generator 103. The output of the generator 103 powers at least one drive module 122 and also supplies power to at least one charger 120 through power switch 116. The supplemental power pack 134 interfaces to the golf cart 136 through a control switch 132 that controls the operation of the fuel engine 102 which drives the generator 103 and the cart controller 128. Additionally, the cart controller 128 also receives power from the drive module 122. An additional interface connects the charger 120 to the battery 126 for charging.

Continuing the description of FIG. 1, there is illustrated an embodiment in which power is supplied to a golf cart 136 by a supplemental power pack 134. The source of power may be either an onboard fuel engine 102, which is coupled to the generator 103, an external source 118, or both. The external source may include, but is not limited to, a standard house alternating current, plug, battery, or other form of power supplying mechanism. Additionally, a source of power is not limited to a fuel engine or an external source; instead, the source of may be any power generating mechanism.

The fuel engine 102 may also be connected to a fuel tank 100, which supplies fuel to the fuel engine 102. In a preferred embodiment, the fuel tank 100 is molded to fit within the vacant spaces of an existing golf cart 136. It is anticipated that the fuel engine 102 may run on gasoline, however, alternative fuels are also contemplated herein, including diesel, E85, ethanol, biodiesel, or any other type of fuel capable of feeding a compatible fuel engine. In other embodiments, a substitution for the fuel engine 102 and generator 103 combination may be included, including a battery, super capacitor, fuel-cell or other power source capable of providing lasting power.

The fuel tank 100 further comprises a fuel shut off valve 104 that allows an operator to manually shut off the fuel supply to the fuel engine 102. This feature may be useful, for example, for fire suppression purposes, transport, and storage. In a preferred embodiment, the fuel shut off valve 104 is integrated with and controlled by a control switch 132 installed in the cabin of a golf cart 136, allowing an operator to control fuel flow from the driver seat of the golf cart 136. However, other embodiments may include, but are not limited to, a remote fuel switch, button, or automated sensor configured to selectively prevent the fuel tank 100 from supplying fuel to the fuel engine 102.

In a preferred embodiment, the fuel tank 100 also has an overflow tube 106. The overflow tube 106 is configured to allow fumes, or spilt fuel, to be vented away from a source of ignition. The fuel tank may also comprise a vent cap configured to trap fumes and fuel within the fuel tank 100. Additionally, other embodiments may also include a fuel tank 100 having a vent or other opening that allows fuel or spilt fuel to be removed or isolated from a source of ignition.

In order to start the fuel engine 102 more efficiently, a timer switch 108 may be added to the RPM control of the fuel engine 102. Revolutions per minute (RPM) control is provided to allow the generator 103 to automatically sense the AC load and vary the RPM of the generator 103 as needed to supply the load from a "no-load" to "maximum allowable load" ("normal operating maximum RPM") conditions. An RPM control module allows the generator to operate at higher speeds when demand is high and a lower speed when the demand is low. The RPM control module has a timer switch 108. When starting the fuel engine 102, it is advantageous to delay the operation of the RPM control module. Upon start-up, the timer switch 108 is activated and disabling the RPM control, thereby allowing the fuel engine 102 to run at a normal operating maximum RPM. until the timer switch 108 automatically shuts off and the engine returns back to idle or drive speed. It is anticipated that for most applications, the timer switch 108 may be activated for about thirty seconds. This design allows for engine warm-up in cold conditions, charger start-up testing, and heavy load start-up with little or no voltage drop. Alternative embodiments may include, but are not limited to, a manual switch on the generator panel to allow max designed RPM at all times or to selectively allow the generator to automatically sense the AC load and vary the RPM of the fuel engine 102 as needed to supply the demanded load from maximum allowable to a no load condition.

Other features of the fuel engine 102 may also include an exhaust pipe for transferring the exhaust produced by the fuel engine 102 outside the golf cart. The exhaust pipe and engine cooling air exhaust may also have a flap or isolation compartment configured to prevent substances from entering into the exhaust pipe and cooling shroud. Additionally, a cooling, air filtering system intended to ensure proper operation of the fuel engine 102 may also be implemented. Positive crankcase ventilation or catalytic converters may also be optionally employed The fuel engine 102 may also comprise a start cord. The start cord allows an operator to manually start the fuel engine 102. The fuel engine may also be electrically started by a control switch 132 in conjunction with the starter 105 and ring gear 101. Additionally, a combination of a start cord and electric starter may also be implemented.

Figure 3:
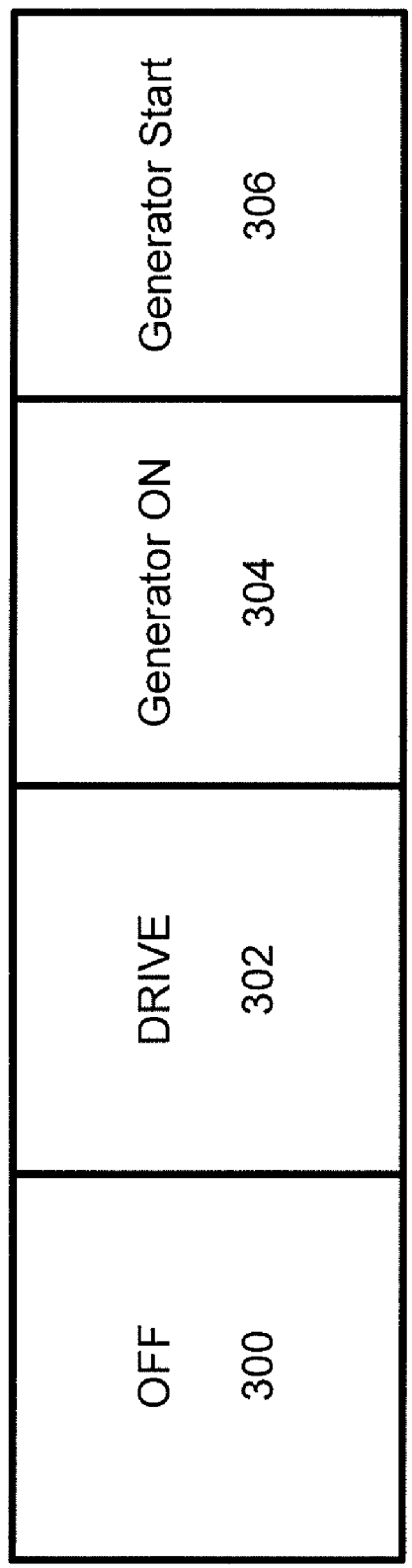
FIG. 3 illustrates the different positions on a control switch.

The control switch 132, which will be described in more particularity in FIG. 3, is configured to allow an operator to manually activate or deactivate the source of power, which in one embodiment, would be the fuel engine 102 and generator 103 combination. In a preferred embodiment, the control switch 132 is electrically coupled to a cart controller 128, thus, allowing the control switch 132 to also control the operations of the golf cart. However, in an alternate embodiment, the control switch 132 may be separate and remote from the cart controller 128. By coupling the control switch 132 to cart controller 128, the control switch 132 may be configured to the "OFF", "DRIVE", "Generator ON", or "Generator Start" positions. In the "Off" position, the fuel shut off valve 104, fuel engine 102, generator 103, and cart controller 128 are all in the off position. In the "DRIVE" position, the golf cart 136 can be driven by, i.e., battery 126, operations only, or by battery 126 coupled with power supplied by supplemental power pack 134 operations. Alternatively, in the "Generator ON" position, the golf cart 136 drive controller is in the OFF position while the fuel engine 102 and generator 103 may be running; however, at this position the golf cart 136 is unable to be driven, but if running the fuel engine 102 and generator 103 can transfer power to the battery 126 and to an external outlet 124. When the cart controller 128 is set to the "Generator Start" position, the electric starter mechanism described below will start the engine. The control switch 132 is spring-loaded so that upon release of the control switch 132 once the engine 102 and generator 103 are started, the control switch 132 would revert back to the "Generator ON" position and provide operations as set forth above. In order to drive the golf cart 136, an operator would then turn the control switch 132 to the "DRIVE" position. Additionally, in order for an operator to leave hybrid operations and drive the golf cart 136 by battery 126 operations only, the operator would turn the control switch 132 to the "OFF" position and then back to the "DRIVE" position. This is designed as a safety feature helping to prevent an operator from accidentally leaving the fuel engine 102 and generator 103 running. For further safety, the golf cart 136 is preferably stopped anytime the control switch 132 is moved from one setting to another setting. Alternative embodiments include, but are not limited to, allowing an operator to leave hybrid operations without first switching the control switch 132 back to "OFF." According to other embodiments, the manual controls performed by an operator may be done automatically by programming or other electronic means. One skilled in the art may appreciate that these options may not necessarily be configured in the order previously described and may be configured in an alternative order to suit the application.

In a preferred embodiment, a key is used to manage the control switch 132. The key, for example, may be a key similar to a key that is used on traditional golf carts. The key manages the selection of the control switch 132 to one of the four operating positions. The key can be removed in at least two positions: "OFF" and "Generator ON" positions. When the key is removed in either or those two positions, the cart controller 128 is disabled, preventing the cart from moving. Thus, although the fuel engine 102 and generator 103 may still be running, the golf cart 136 cannot be driven, allowing for the continued operation of the supplemental power supply 134 while securing the mobility of the golf cart 136. As a result, the charger can be used to charge the battery 126 and to supply power to the auxiliary outlet 112 so that it too may be used.

Figure 5:
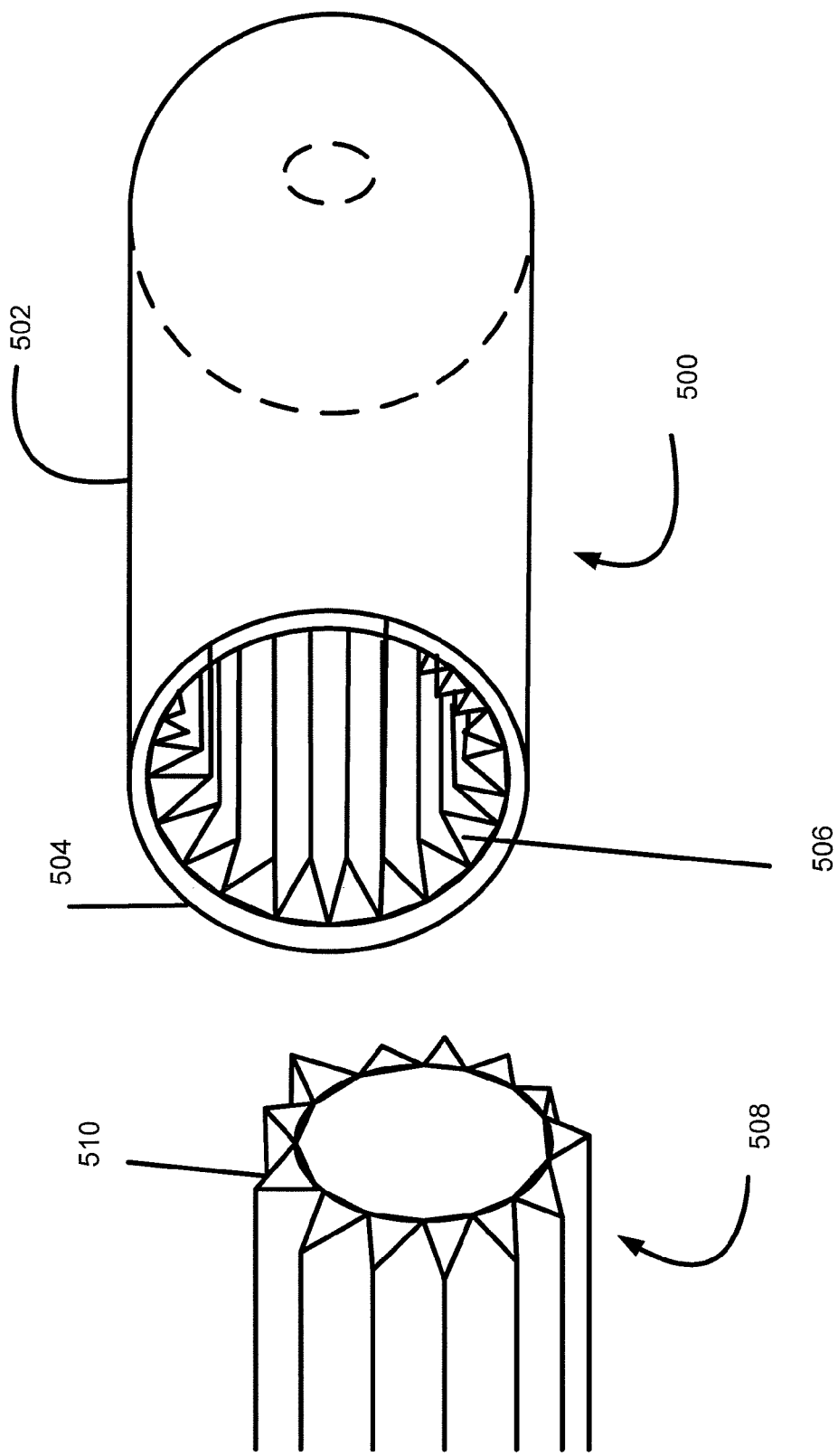
FIG. 5 illustrates a side view of a ring gear and starter bendix that allows for electric starter installation on small engines in inherently small, confined spaces.
Figure 6:
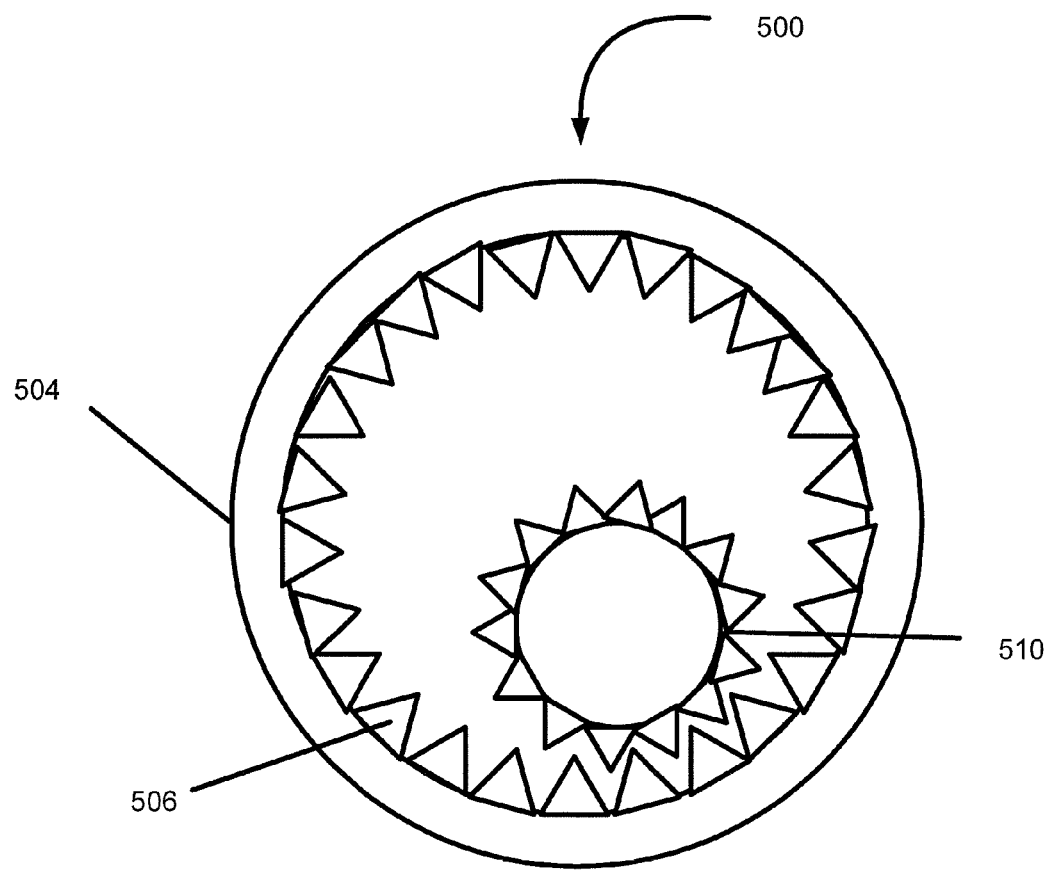
FIG. 6 illustrates a cross-sectional view of a ring gear with a starter bendix therein that allows for electric starter installation on small engines in inherently small, confined spaces.

As illustrated in FIG. 1 and described in more particularity in conjunction with FIG. 5 and FIG. 6, the fuel engine 102 may also be connected to a ring gear 101. The ring gear 101 allows for electric starter 105 installation on small engines without the need for pull ropes or other starter mechanisms. This permits the supplemental power supply 134 to be a very small fuel engine 102 and generator 103 combination and be installed in inherently small, confined spaces. Depending on the application for the supplemental power supply system 134, the embodiment works well with engine sizes that are 185 cc or less. The ring gear 101 is connected to a starter 105, which is controlled by the control switch 132. When the operator turns the control switch 132 to the "Generator Start" position, a bendix on the starter 105 will spring into and rotate the ring gear 101, having ring gear teeth on the interior, thereby activating the engine. Alternatively, the ring gear 101 can be configured into a concave or convex shape allowing the ring gear 101 to have a greater mass. The greater mass of a ring gear 101 allows it to achieve greater momentum when attempting to start the engine.

Additionally, the fuel engine 102 may further comprise a choke which is typically a manually operated cable pull-type. In a preferred embodiment, the choke is operated by a push-button on the cart dash. As understood by those skilled in the art, the choke assists the fuel engine 102 in starting after prolonged lack of use or under cold conditions. The choke comprises, but not intending to limit, a push-to-on button, a solenoid, a pull connector rod, and a properly calibrated return spring that returns the choke to the open ("OFF") position.

Additionally, in an alternate embodiment, the fuel engine 102 is not connected to an electric starter 105. Instead, the fuel engine 102 may be activated by an operator manually pulling the start cord connected to the fuel engine 102.

The fuel engine 102 is coupled to a generator 103 to supply supplemental power to a golf cart 136. In addition, the generator may also have at least one auxiliary outlet 112 configured for use as an auxiliary power source for powering a variety of items including, but not intending to limit, power tools, cell phones, radios, televisions, cameras, computers, or other tools and appliances. In a preferred embodiment, the auxiliary outlet is an 120 volt AC outlet. The auxiliary outlet 112 may also have a ground fault sensor 114 connected thereto which allows the auxiliary outlet 112 to detect improper grounding and to trip a breaker in order to reduce the possibility of electric shock.

The fuel engine 102 coupled to a generator 103 supplies AC power to a power switch 116, which also may receive AC power from an external source 118. Although AC power is used throughout to describe a preferred embodiment, one skilled in the art may appreciate that DC power may be used as well. The power switch 116 is configured to select power from either the fuel engine 102/generator 103 combination, another onboard source (if any), or from the external source 118. The power switch 116 may be programmed to select power from the external source if both the external power source 118 and the fuel engine 102/generator 103 combination are supplying power. For example, the power switch 116 may automatically use the power supplied by the external source 118 and perhaps provide feedback to shut down the fuel engine 102. Other embodiments may also include, but are not limited to, a manual power selector switch to allow an operator to manually select which power source to use, or a power selector switch integrated with the door of a compartment that is designed to cover and allow access to an external supply charging cord, thereby automatically activating a power switch 116 whenever the door is opened and deactivating the power switch 116 whenever the door is closed.

Upon receiving power from either the external source 118 and/or the generator 103, the power switch 116 transfers AC power to the charger 120. The charger 120, using sensors, measures the current state of the battery 126 while also converting the AC power into DC power and transferring the DC power to charge the battery 126 on board the golf cart 136. The parameters that may be measured may include, but are not limited to, temperature, voltage, amperage, charge rate, fully charged, >80% charged, <80% charged, AC power supply status, battery or charger overheating, and other charger error codes. The charger 120 is additionally connected to a display 124 that allows the operator to view the battery's 126 state of charge. In a preferred embodiment, the display 124 is mounted in view of the driver of the golf cart 136 so that the driver may easily monitor the state of the battery 126. Furthermore, the charger 120 may also use these parameters to determine when to stop charging the battery 126 once it senses that the battery 126 does not require further charging.

Both the charger 120 through the battery 126 and the drive module 122 independently provide motive power to the golf cart 136 through the cart controller 128. The charger 120 keeps the battery 126 charged under all but heavy load conditions, for example, driving the cart up hills or at high speeds. Under these heavy load conditions, the drive module 122 transfers excess power, over and above the power the charger 120 is providing to the battery 126, to the cart controller 128.

In addition to transferring AC power to the power switch 116, the fuel engine 102 coupled to a generator 103 may be the sole supplier of AC power directly to the drive module 122. In a preferred embodiment, the drive module 122 is a constant voltage and ampere limited type power supply. It will provide at its outlet a constant voltage and variable amperes up to the design ampere limit, then the voltage will drop as that limit is exceeded.

The drive module 122 converts AC power into DC power and transfers DC power to the cart controller 128. The cart controller 128 then converts the power into motive power to be utilized by the electric drive motor 130. The use of the drive module 122 provides an extra boost for the electric drive motor 130 over and above the needed charging power provided by the charger 120 to the battery 126 therefore, conserving battery power for battery-powered only operations.

Figure 2:
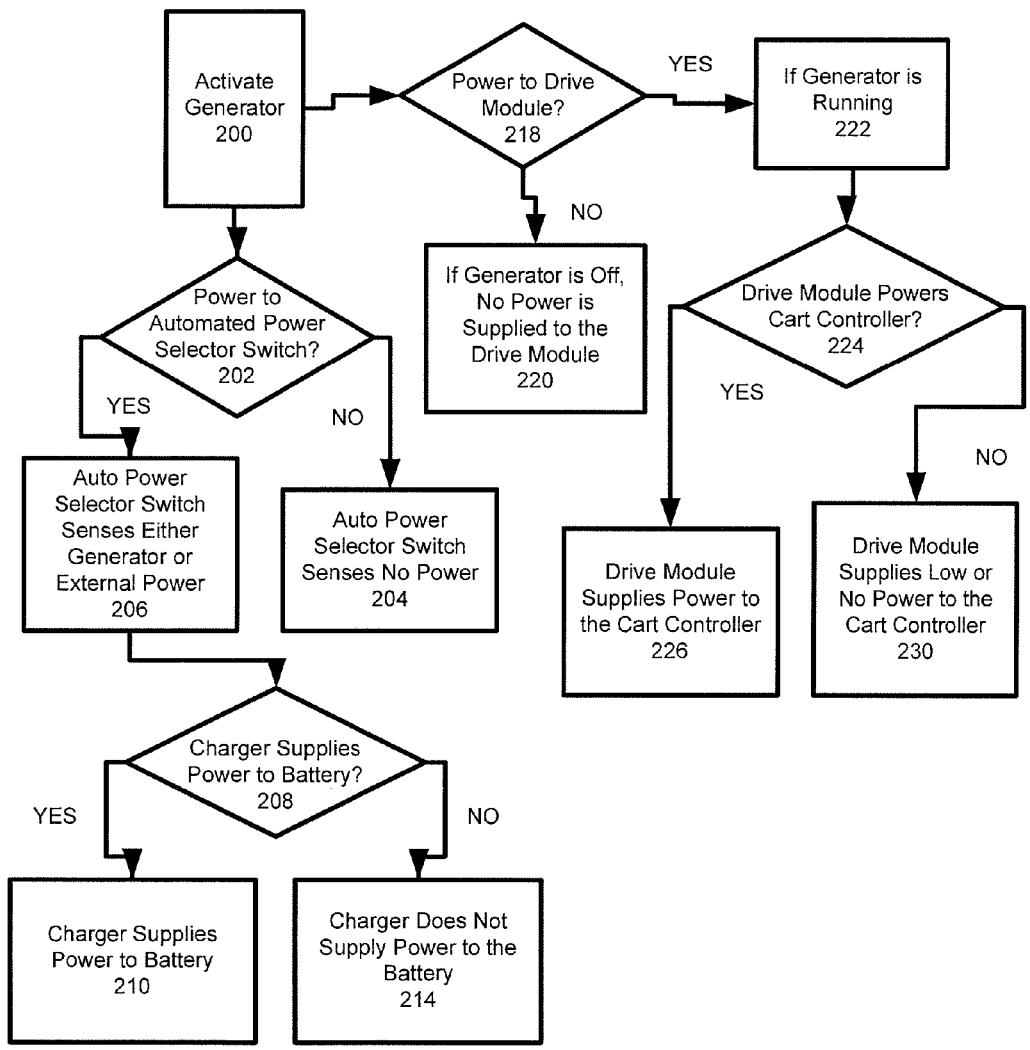
FIG. 2 is a flow chart of the method in which power is transferred from an alternative fuel engine coupled to a generator to the battery and electric drive motor of a golf cart.

FIG. 2 illustrates the decision process involved when AC power is supplied from the generator 103, which is coupled to the fuel engine 102, to the battery 126 and electric drive motor 130 of a golf cart 136. At step 200, an operator activates the generator by turning the control switch 132 to the "Generator Start" position. The control switch 132 then causes the starter 105 and bendix to enter into the ring gear 101 and turns the ring gear 101. The turning ring gear activates the engine which powers the generator.

AC power is transferred from the generator 103, which is coupled to a fuel engine 102. At step 202, the determination is made as to whether there is power being transferred to the automatic power selector switch 116. If the automatic power selector switch senses no power from the generator 103 or alternatively, no power from an external power source 118, then the process stops at step 204. However, if the power switch 116 senses either AC power from the generator 103 or external power source 118, then the AC power is transferred over to the charger 120 at step 206.

At step 208, the decision is made whether to charge the battery 126 based on at least one of the sensor information. At step 208, the charger 120 senses amps, volts, and/or temperature of the battery 126. If there is no need to charge the battery 126 based upon the manufacturer's specifications, or specifications adopted by a user or installer, the charger 120 will not charge the battery at step 214. However, if, at step 208, the charger senses there is a need based upon manufactured specifications, then, at step 210, the charger will continue to transfer power to the battery 126.

Additionally, AC power is also transferred from generator 103 coupled to the fuel engine 102 to the drive module 122 at step 218. At step 220, if the generator 103 is off, then no power is supplied to the drive module 122. If the generator 103 is running at step 222, then the drive module 122 is receiving power. At step 224, the drive module 122 senses the demand for amps and volts to determine whether or not to supply power to the cart controller 128. If the drive module senses high power demand (based on amperage and/or voltage readings), then, at step 226, power is supplied to the cart controller 128. On the other hand, if the drive module 122 senses low or no power demand at step 224, then low or no power is supplied to the cart controller 128 at step 230.

FIG. 3 illustrates the positions of the control switch 132. The control switch 132 may have four different positions as discussed supra: "Off" 300, "DRIVE" 302, "Generator ON" 304, and "Generator Start" 306. In a preferred embodiment, the control switch 132 is operated by a key. At the "OFF" 300 position, the fuel shut off valve 104, fuel engine 102, generator 103, and cart controller 128 are all in the off position. Additionally, at the "OFF" 300 position, the key can be removed, thus, preventing another operator from driving or activating the golf cart 136.

At the "DRIVE" 302 position, the golf cart 136 can be driven in either battery 126 only operations or by battery 126 coupled with power supplied by supplemental power pack 134 operations through the drive module 122 and through the cart controller 128.

At the "Generator ON" 304 position, the fuel engine 102 and generator 103 are capable of running; however, the golf cart 136 is not able to be driven. Additionally, at the "Generator ON" 304 position, in a preferred embodiment, the key may also be removed thereby disabling the cart controller 128. This allows the operator to be able to charge the battery 126 and utilize the auxiliary outlet 112 while simultaneously preventing unwanted operators from driving the golf cart 136.

Additionally, from the "Generator ON" 304 position, the generator may be started by turning the key to the "Generator Start" 306 position, thereby activating the fuel engine 102 and generator 103. At the "Generator Start" 306 position, the control switch 132 is preferably spring-loaded so that upon release of the control switch 132, and once the generator 103 is started, the control switch 132 will revert back to the "Generator ON" 304 position.

Figure 4:
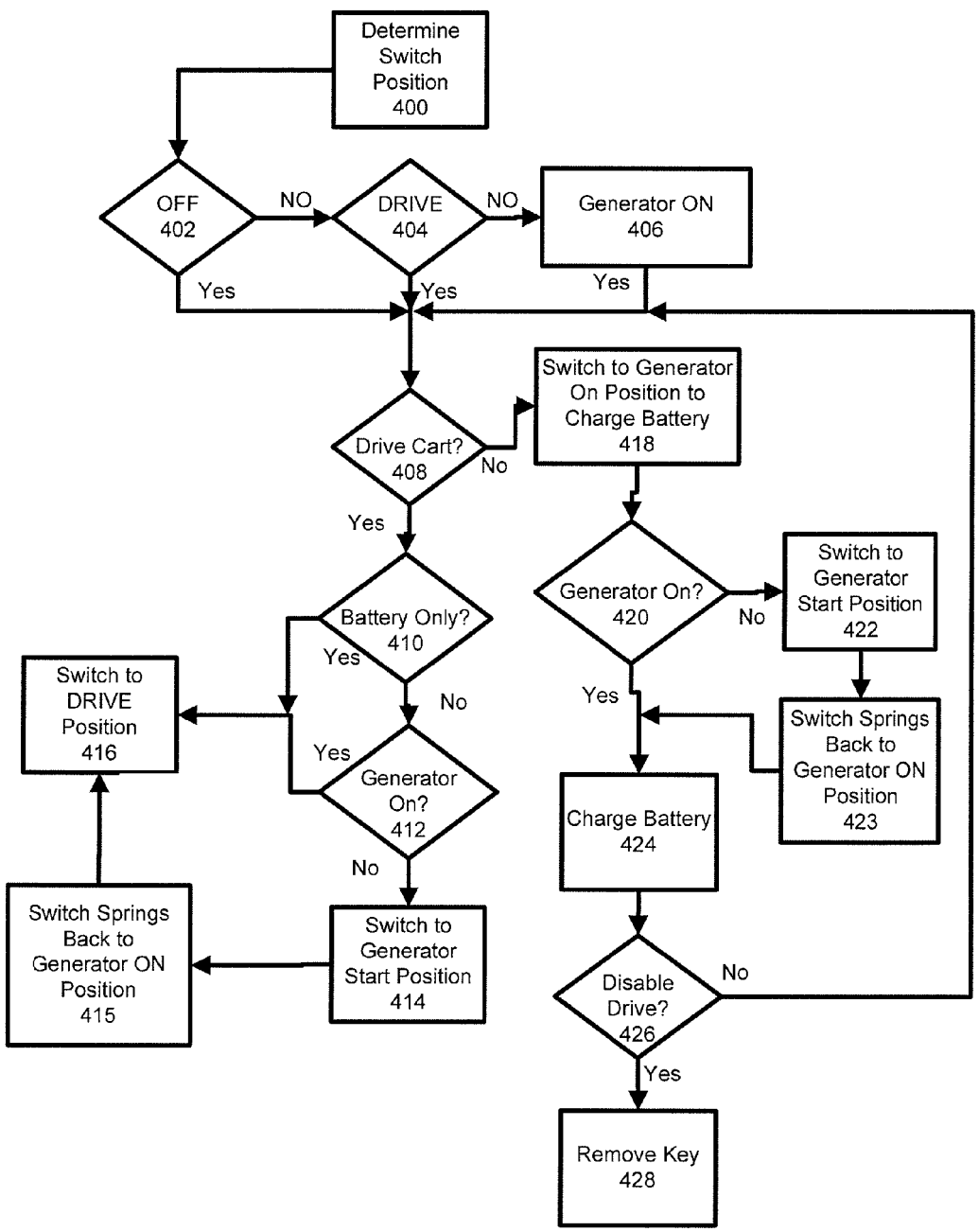
FIG. 4 is a flow chart illustrating the method in which the control switch controls the operation of a golf cart.

FIG. 4 illustrates the decision process involved when turning the control switch 132 to either of the four positions described supra: "OFF" 300, "DRIVE" 302, "Generator ON" 304, or "Generator Start" 306. At step 400, in preparation for operation, the operator determines the control switch 132 position. At step 402, the operator determines whether the control switch 132 is currently at the "OFF" 300 position. If no, then the operator determines, at step 404, whether or not the control switch 132 is currently at the "DRIVE" 302 position. If no, then the operator has determined at step 406 that the control switch 132 is currently in the "GENERATOR ON" 304 position.

From either of those positions, if the operator decides to drive the cart at step 408. The decision is then made at step 410 whether to operate in battery only mode or battery plus generator mode. If battery only mode, then the switch is set to the "DRIVE" 302 position at step 416. If the battery plus generator mode is selected, then at step 412 there is a check to see if the generator 103 is currently on. If the generator 103 is currently on, then the switch is set to the "DRIVE" 302 position at step 416. If the generator 103 is currently off, the switch is set to the "Generator Start" 306 position at step 414. Once the generator 103 has been activated in step 414, then the switch springs back to the "Generator ON" 304 position at step 415 and then can be moved to the "DRIVE" 302 position at step 416.

If the operator, at step 408, decides not to drive the golf cart 136, then the operator turns the control switch 132 to the "Generator ON" 304 position to charge the battery at step 418. At step 420, a decision is made as to whether or not the generator 103 is running. If the generator 103 is not running, the operator, then, turns the control switch 132 to the "Generator Start" 306 position at step 422. Once the generator 103 has been activated in step 422, then the control switch 132 springs back to the "Generator ON" 304 position at step 423 and the battery 126 may be charged at step 424. However, if at step 420, the generator 103 is already running, the operator leaves the control switch at the "Generator ON" 304 position and may charge the battery 126 at step 424. Upon charging the battery 126 at step 424, a decision is made as to whether or not to disable the ability to put the control switch 132 in "DRIVE" 302 at step 426. If the operator decides not to disable this option, then the process may return to step 408 to repeat. But if, at step 426, the operator decides to disable the driving mechanism, then at step 428, the operator may remove the key.

FIG. 5 and FIG. 6 illustrate an embodiment of a ring gear 500. In FIG. 5, the ring gear 500 and starter bendix 508 are presented from a side view. FIG. 6 illustrates a cross-sectional of the ring gear 500 with the starter bendix 508 therein. As discussed earlier, the ring gear 500 allows for an electric starter 105 to be installed on a small fuel engine 102 in inherently small confined spaces. The ring gear 500 comprises a hollow cylinder 502 with an open end 504. The ring gear teeth 506 are located on the interior of the hollow cylinder 502 at the open end 504. When the electric starter 105 is activated, a gear pushes the starter bendix 508 into the open end 504 of the hollow cylinder 502. Other embodiments may include a solenoid, coil, or other apparatus that pushes the starter bendix 508 into the open end 504 of the hollow cylinder. The starter bendix 508 enters into the ring gear 500 in a position whereby the centers of the starter bendix 508 and the ring gear 500 are not concentric and may rotate in either a clockwise or counterclockwise manner. When spinning, the starter bendix teeth 510 will then mesh, on one side, with the ring gear teeth 506. As a result, the ring gear 500 will rotate in the same direction as starter bendix 508, allowing the fuel engine 102 to start. Therefore, the ring gear 500 may be used to add an electric starter on very small engines, especially those less than 185 cc in size, and replace manual start mechanism in that size of engines.

Figure 7:
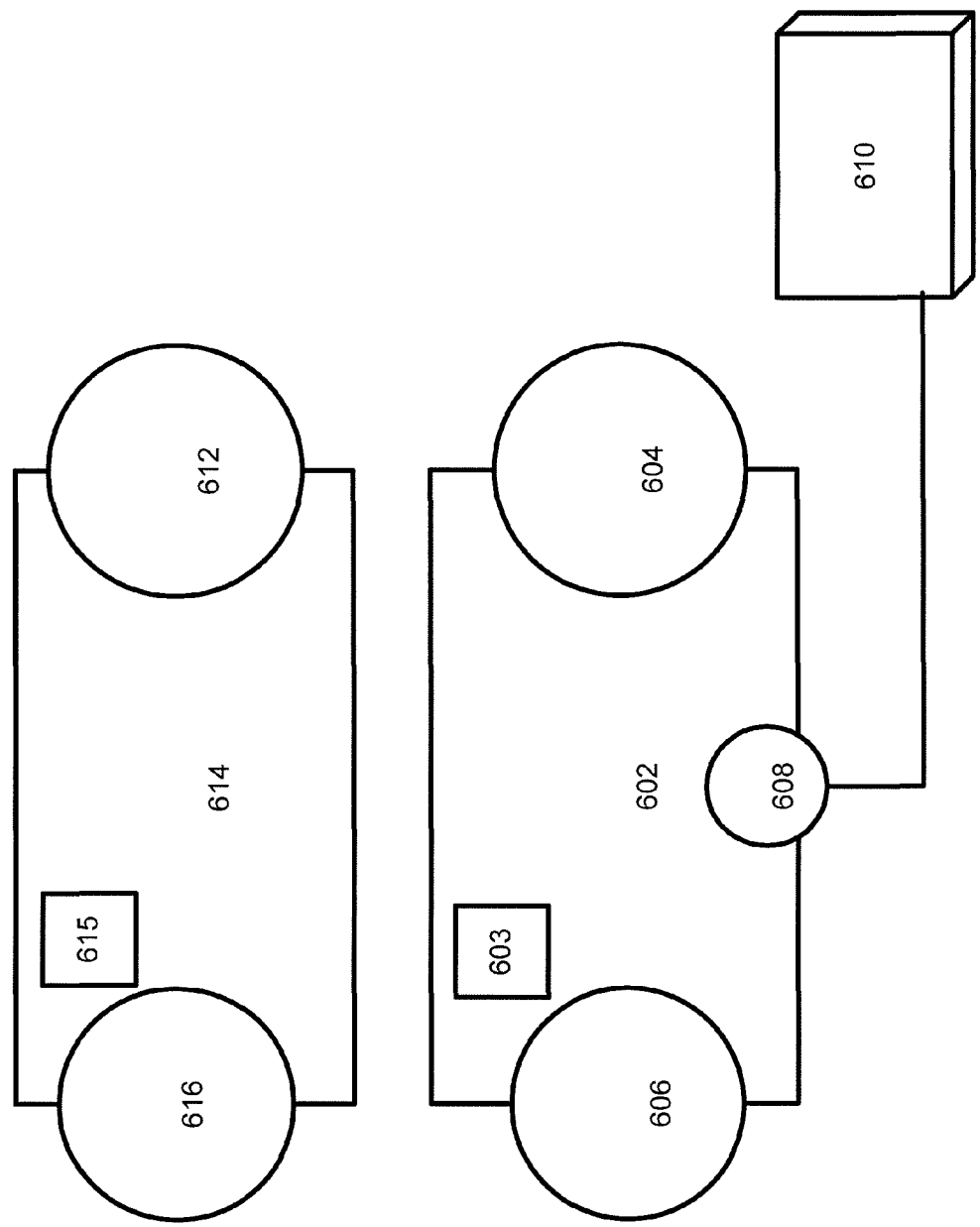
FIG. 7 is a block diagram representative of a device that is configured to supply power to both a battery and an electric drive motor of a golf cart.

FIG. 7 illustrates a charger 602 and a drive module 614 that are configured to supply direct current power to the battery 126 and the electric drive motor 128 of a golf cart 136. The charger 602 is comprised of an input 604, two outputs 606, 608, and a sensor 603. The charger 602 receives AC power from a source of power in the input 604. The charger 602 then converts the AC power into direct current power. The charger 602 uses a sensor to monitor the needs of the battery 126. Depending on the sensed needs of the battery 126, the charger 602 then transfers the direct current power to the battery 126 through output 606. Additionally, the charger 602 is also attached to a display 610, which is configured to display the state of a battery 126. The charger 602 transfers information relating to the state of the battery 126 to the display 610 through an output 608. As discussed supra, the state of a battery 126 may include, but is not limited to, amperage, voltage, temperature, fully charged, greater than eighty-percent charged, less than eighty-percent charged, charge rate, AC power supply, battery or charger overheating, and other charger error codes. The display 610, thus, allows an operator to monitor the state of the battery 126.

The current embodiment also contains a drive module 614. The drive module 614 receives AC power from a source of power through an input 612 and proceeds to convert AC power into direct current power to supply to the cart controller 128. In a preferred embodiment, the generator 103 is the sole source of power to the drive module 614. The drive module 614 then senses, through sensor 615, whether or not the cart controller 128 is in need of power as discussed in FIG. 2. The drive module 122 senses the demand for power to determine whether or not to supply power to the cart controller 128. If the drive module senses high power demand, then, at step 226, additional power is supplied to the cart controller 128. On the other hand, if the drive module 122 senses low or no power demand at step 224, then low or no power is supplied to the cart controller 128 at step 230. If the cart controller 128 needs power, then the drive module 614 transfers power to the cart controller 128 through output 616, which the cart controller converts to motive power for use by the electric drive motor 128.

The present invention has been described in connection with the preferred embodiments of the invention. Although examples have been provided, they were provided merely to assist in enhancing understanding of the invention. In no way should the present invention be limited to the examples provided herein. The present invention should not be limited to any single embodiment but instead, should be construed in breadth and scope in accordance with the appended claims.

What is claimed:

1. A supplemental power supply system for supplying power to an electric drive motor, comprising:
a generator configured to interface with an engine, wherein the engine turns the generator, the engine including a starter, the starter comprising a ring gear having an opening on one end thereof and wherein teeth are formed on an interior surface of the ring gear, the opening sized to receive a cooperating gear of a starter bendix, whereby the rotation of the starter bendix causes the ring gear to rotate in the same direction;
a charger coupled to the generator, wherein the charger provides charging power to a battery; and
a drive module coupled to the generator, wherein the drive module provides power to the electric drive motor and wherein the battery simultaneously provides power to the electric drive motor.

2. The system of claim 1 wherein the control switch is connected to a starter, wherein the starter is configured to provide control signals and wherein the starter is further configured to start the engine.

3. A hybrid power supply for a vehicle, comprising:
an engine coupled to a generator, the engine for turning the generator, the engine comprising a starter, the starter comprising a ring gear having an opening on one end thereof and wherein teeth are formed on an interior surface of the ring gear, the opening sized to receive a cooperating gear of a starter bendix, whereby the rotation of the starter bendix causes the ring gear to rotate in the same direction;
a battery coupled to an electric drive motor;

a charger coupled to the generator, wherein the charger provides charging current to the battery;
a drive module coupled to the generator, wherein the drive module provides current to an electric drive motor and wherein the battery simultaneously provides current to the electric drive motor.

* * * * *